Patented Nov. 15, 1949

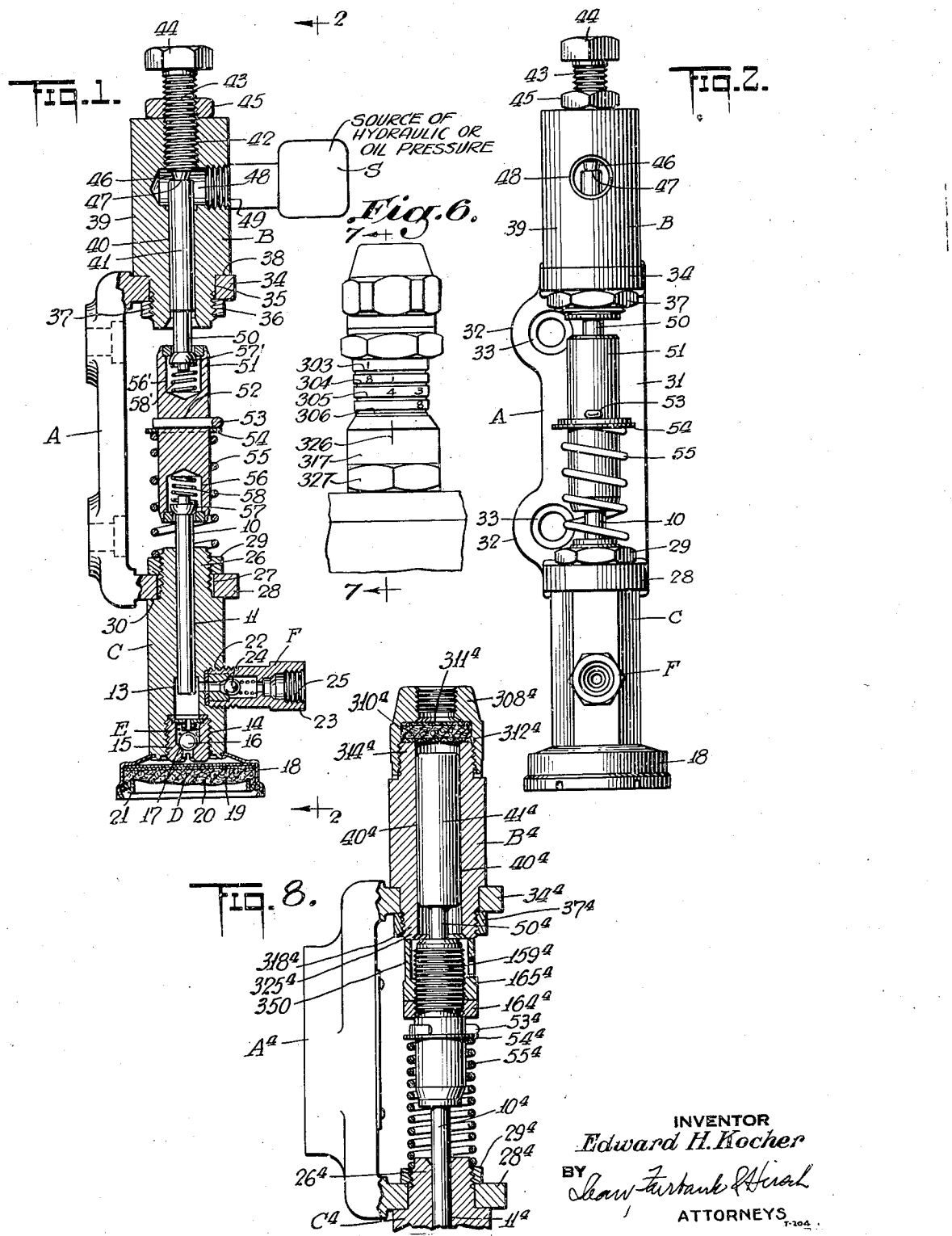

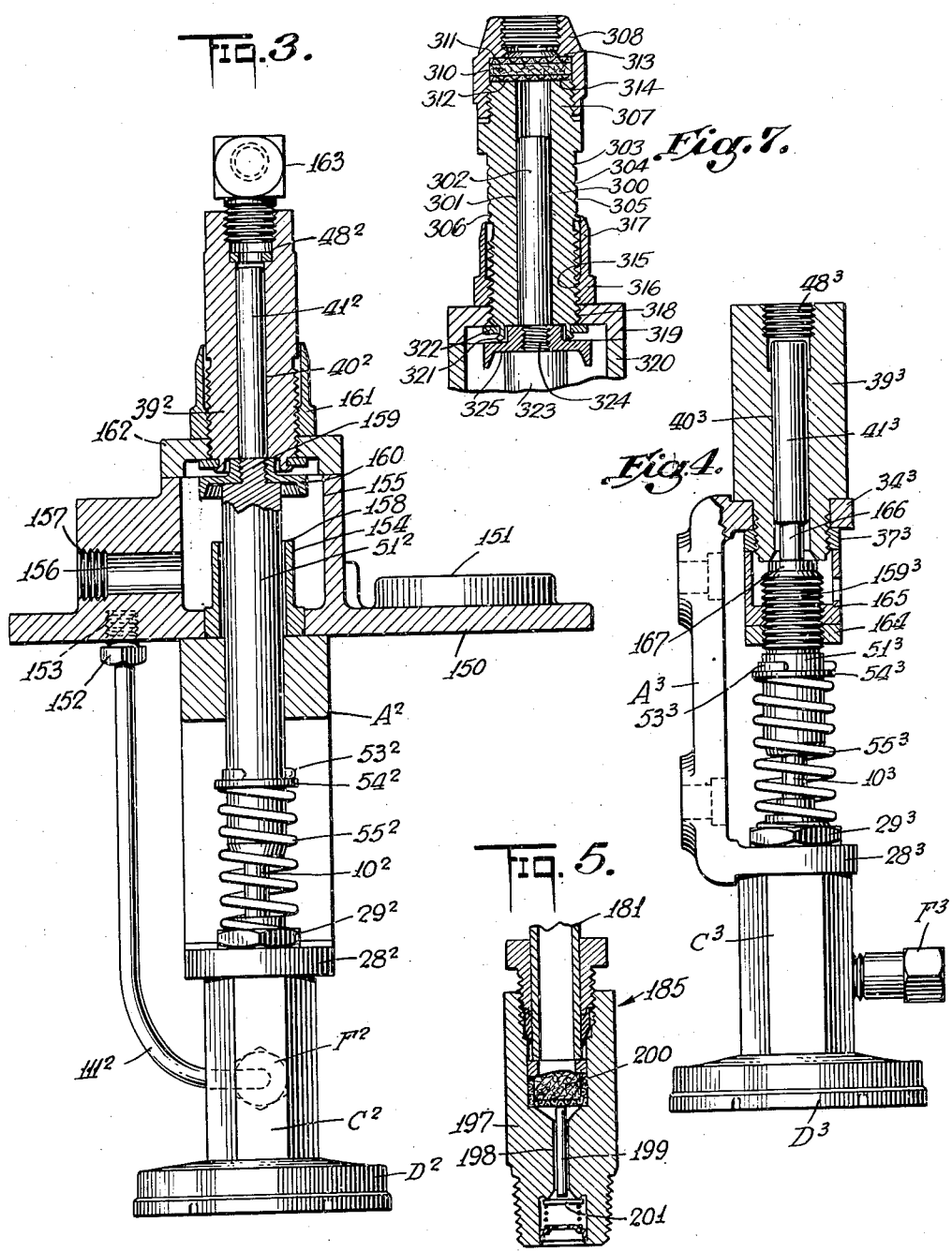

2,487,812

UNITED STATES PATENT OFFICE 2,487,812

LUBRICANT PUMP FOR HYDRAULICALLY OPERATED MACHINE TOOLS

Edward H. Kocher, Boonton, N. J., assignor to Auto Research Corporation, a corporation of Delaware Application August 3, 1940, Serial No. 350,647

7 Claims. (Cl. 184—29)

The present invention relates to machine tool constructions, and it particularly relates to lubricated machine tool installations.

Although not restricted thereto, the present invention will be particularly described in connection with its application to lubrication of machine tool constructions which have in and about the machine tool a source of intermittent or varying oil or hydraulic pressure, and which machine tools have built therein an installation for supplying minute, yet accurately proportioned, quantities of lubricant to the various bearings in and about the same requiring lubrication.

It is among the objects of the present invention to provide an improved machine tool construction of the character described, in which without mechanical drive or without driving gears or levers, it will be possible to build unitarily therein means for lubricating and supplying lubricant to the various bearings in and around the machine tool, which lubricant will be supplied automatically by power derived from an intermittent oil or hydraulic pressure source in and around the mechanism to be lubricated.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory according to one embodiment of the present invention, to provide a distributing conduit or bore system in and around the mechanism to be lubricated, having a single inlet from the lubricant pressure source and leading to the bearings to be lubricated, which bore system will carry a plurality of highly restricted full metering outlets affording a tremendously greater obstructing effect to the flow of lubricant than the tubing or bores extending through the mechanism or of the bearings to be lubricated.

In the preferred construction, the pressure source is positioned at or adjacent to a pocket or recess receiving a body of lubricant which may be replenished and which may be provided with indicator means to show when the lubricant has been or is about to be exhausted.

In the desired form of the invention, the source of lubricant pressure consists of two aligned reciprocating pressure-responsive or creating devices, one forming a pump and consisting of an elongated unpacked plunger fitted in an elongated body having a central bore, said body carrying suitable inlet and outlet ball checks and an inlet flow filter.

Connected to and supporting the body, is preferably a bracket desirably of U-shape, the base of which is connected to the side of the pocket or recess in the mechanism to be lubricated.

One leg of the U preferably carries the pump body, while the other leg desirably forms a bearing for a connecting rod which serves as a connection to a suitable pressure responsive motor, preferably of the piston cylinder variety. The cylinder of the motor is connected to the source of intermittent or varying hydraulic or oil pressure in and about the mechanism to be lubricated.

In the drawings which show one of the various possible embodiments which may be constructed according to the present invention, but to which the invention should not be restricted, since this embodiment is merely illustrative, Fig. 1 is a longitudinal sectional view of one form of a central pressure source which may be associated with a mechanism of the type previously described;

Fig. 2 is a side elevational view taken upon the line 2—2 of Fig. 1;

Figs. 3 and 4 are respectively side elevations in partial longitudinal section of alternative pump units;

Fig. 5 is a longitudinal sectional view of one type of flow metering outlet fitting;

Figs. 6 and 7 are respectively elevational and sectional views of an alternative hydraulic motor, Fig. 7 being taken upon the line 7—7 of Fig. 6, said motor being used with a piston pump of the character shown in Figs. 1, 2, 3 and 4;

Fig. 8 is a transverse sectional view of still another alternative hydraulic motor construction which may be utilized in connection with the piston pumps in Figs. 1, 2, 3 and 4.

Referring to Figs. 1 and 2, the pressure source essentially consists of a U-shaped bracket A, a hydraulic or oil pressure motor B, and a pump unit C. The pump unit C is provided with an inlet filter D, an inlet check valve unit E, and an outlet check valve unit F. The pump unit includes the elongated unpacked piston plunger 10, which fits in a bore 11 in the body C of the unit, said body preferably, for example, being of hexagonal brass stock.

The bore 11 is enlarged at 13 to form a chamber for receiving the lubricant and from which the lubricant is discharged upon reciprocating movement of the elongated plunger 10.

The bottom of the body 12 is provided with a tapped recess 14 which receives the body 15 of the ball check unit E. This body is provided with a central passage therethrough, receiving the spring seated ball check 16, and is provided with the valve seat 17.

The lower end of the body 12 is provided with the cup shaped member 18 in which is positioned the filter screens 19 and the filter pad 20 held in position by the ring 21.

The side of the body 12 is provided with a tapped recess 22 receiving the threaded end of the body 23. The body 23 receives the spring seated ball check 24 and has a tapped connection 25, enabling it to be coupled to an outlet tube.

The upper end of the body 12 is of reduced diameter and threaded, as indicated at 26, and it is received in the opening 27 on the leg 28 of the bracket A. The nut 29 clamps the leg 28 firmly against the shoulder 30 on the body 12.

The base 31 of the bracket is provided with the outstanding ears 32 (see Fig. 2), which receive the bolt holes 33.

The upper leg 34 of the bracket is provided with an opening 35, into which projects the threaded portion 36 receiving the nut 37, which clamps the shoulder 38 against said leg 34.

The hydraulic motor unit B has a body 39 having a central bore 40, which receives the piston member 41. The upper portion of the bore is threaded, as indicated at 42, and receives an adjustable stop screw 43 having a head 44 and a locking nut 45.

The stop screw 43 has a projecting nipple 46 which forms a stop for the upper end 47 of the piston member 41.

The body 39 is provided with a transverse bore 48, which is tapped at 49 to enable connection to a suitable source S of intermittent hydraulic or oil pressure in or about the mechanism to be lubricated or other source of lubricant pressure. The piston 41 is provided with a connection at 50 to the upper end of the connecting rod or member 51 of the same construction as the lower end of the rod 51, similarly functioning parts being indicated by the same numerals primed.

The element 51 is provided with a transverse opening 52, which receives a pin 53 holding in position the spring reaction washer or plate 54. The coil spring 55 encircles the lower end of the element 51 and reacts against said washer 54 and against said nut 29 and tends to press the upper end 47 of the piston 41 against the adjustable stop 46. The lower end of the member 51 is provided with a recess 56, which receives the mushroomed head 57 of the piston 10, pressed downwardly by the spring 58.

In the device shown in Figs. 1 and 2, when pressure is applied to the inlet 48 of the unit B, the piston 41 will be forced downwardly, compressing the spring 55 and moving down the piston 10. This will cause a discharge stroke and lubricant will be ejected past the outlet ball check 24 toward the bearings to be lubricated. When pressure is released through the inlet 48, the spring 55 will expand, moving the piston 41 up against stop 46 and moving the piston 10 upwardly, which will draw a charge of lubricant into the chamber 13 past the filter D and the inlet ball check E.

The unit as shown is particularly suitable for use in connection with a hydraulically operated broach in which the hydraulic pressure will vary with each stroke of the broach. The piston as shown may have a stroke ranging from about $\frac{1}{8}$ to $\frac{1}{2}$ of an inch, with a piston size of from about $\frac{3}{16}$ to $\frac{3}{8}$ of an inch, and the unit as shown may have an over-all length of $7\frac{1}{16}$ inches, and a maximum width of about 2 inches.

In the construction of Figs. 3 and 4, correspondingly functioning parts of those as shown in Figs. 1 and 2 are indicated by the same letters and numerals, however, respectively provided with a superior 2 and a superior 3.

In the construction of Fig. 3, the reservoir cover 150, having the inlet opening 151, carries the bracket $A^2$. The outlet connection $111^2$ has a coupling connection at 152 to a socket 153 in the cover, which connects to an external distribution system (not shown).

The cover 150 is provided with a sleeve 154, which encircles the connecting rod $51^2$. The sleeve 154 extends upwardly into the chamber 155 formed on the top of the cover 150 and provided with the passage 156 which may be connected by the tapped socket 157 to a conduit to drain any escaped hydraulic fluid back to the hydraulic reservoir.

The chamber 155 serves to collect any leak which flows past the hydraulic piston $41^2$, and the upper end 158 of the sleeve 154 is sufficiently high to prevent overflow of hydraulic fluid into the interior of the lubricant reservoir which is covered by the element 150.

The upper end of the connecting rod has a reduced diameter threaded portion 159, which receives the stop disc 160.

The interiorly threaded sleeve 161 fixes the body $39^2$ to the cover 162 of the upper chamber 155. The inlet connection $48^2$ is at the top of the hydraulic motor body $39^2$, and the adapter 163 connects the chamber $40^2$ through said inlet socket $48^2$ to a source of changing hydraulic pressure.

In the construction of Fig. 4, the U-shaped bracket $A^3$ may be of the same construction as A in Fig. 1; and the pump $C^3$ of the same construction as C in Fig. 1.

The connecting rod $51^3$ is provided with an upper threaded portion $159^3$, which receives the nuts 164 and 165, the nut 165 being adjustable and being locked in adjusted position by the nut 164 upon the threaded shank $159^3$ to adjust the stroke.

The hydraulic piston $41^3$ has a reduced lower end portion 166 which contacts the upper end 167 of the connecting rod $51^3$.

The hydraulic pressure connection in Fig. 4 is made as in Fig. 3, to the end of the body $39^3$, through the inlet socket $48^3$.

A typical outlet meter unit as shown in longitudinal sectional view, Fig. 5, is provided with a body 197 having a bore 198 which is substantially completely filled by the pin 199. The pin 199 forms a crevice with the bore 198 of the order of one to several thousandths of an inch, which has a substantially greater restricting effect than the conduit system of a bearing.

Each flow metering unit has an inlet strainer 200 and an outlet check valve 201.

In Figs. 6 and 7 is shown an alternative hydraulic motor construction in which the sleeve 300, has a bore 301, that receives the motor piston 302. The sleeve 300 is exteriorly provided with a series of marking rings 303, 304, 305 and 306, carrying different graduations or numerals thereon.

The upper portion of the sleeve 300 is threaded, as indicated at 307, and receives a cap 308. The strainer 310 having the upper and lower screens 311 and 312, is clamped between the shoulder 313 of the cap 308 and the top portion 314 of the sleeve 300.

The lower portion of the sleeve 300 is threaded at 315 and it receives the threaded sleeve portion 316 of the tapered member 317. The sleeve 315 is threaded into the opening 318 in the top of the cap 319, said cap being attached to the chamber 320.

The lower end of the sleeve 300 is provided with the out turned portions 321 which receive the washer 322. The connecting rod 323, which extends downwardly to a pump (not shown) of the same construction as already described in connection with Fig. 1, has a threaded reduced diameter portion 324 at the top thereof, which receives the stop disc 325, the upper face of which contacts the down turned portion 321.

It will be noted by reference to Fig. 6, that the sleeve 317 has a mark 326 above the hexagon portion 327, which enables turning off said sleeve 317 until the mark coincides with one of the numerals on the rings 303 to 306. This will enable adjustment of the stroke of the connecting rod 323 and the discharge of the pump.

In the motor construction shown in Fig. 8, the bracket A⁴ has the leg 34⁴ which carries the hydraulic motor B⁴ and the legs 28⁴ which carries the pump C⁴. The piston 41⁴ of the hydraulic motor is received in the bore 40⁴ and it has a reduced diameter portion 56⁴ which contacts the upper threaded portion 159⁴. The portion 159⁴ receives the lock nut 164⁴ and the adjusting nut 165⁴. The lock nut 164⁴ has an upwardly extending sleeve 350 which contacts the lower end 325⁴ of the threaded portion 318⁴ of the hydraulic motor B⁴. By changing the position of the nuts 164⁴ and 165⁴, it is possible to vary the stroke of the piston 10⁴.

Between the cap 308⁴ and the nipple portion 314⁴ is clamped the filter or strainer 310⁴ with its facing metal screens 311⁴ and 312⁴.

The strainers 311 of Fig. 7 and 311⁴ of Fig. 8, will prevent any chips or dirt from getting into the cylinder formed by the bores 301 in Fig. 7 or 40⁴ in Fig. 8.

In operation, the hydraulic pressure supplied to the hydraulic motor B will either be varied upon turning on or turning off the machine or an automatically actuated valve may be provided to turn on and turn off the hydraulic pressure intervals so that the piston 10 will be caused to reciprocate to discharge lubricant into a distributing system with flow metering outlet fittings as indicated in Fig. 5.

In this manner assurance will be had that the lubricating installation will be fed lubricant during operation of the machine, which lubricant in turn will pass to the bearings.

In Figs. 4 and 8, the adjustment is made by unlocking the nuts 164 and 164⁴ and changing the position of the stop members 165 and 165⁴.

In Fig. 6, the rings 303 to 306 indicate respectively ⅛, ¼ and ⅜ of an inch strokes, with the maximum stroke being ½ of an inch.

By turning the nut 303 and bringing the mark 326 opposite one of the fractional numerals, the stroke can thus be controlled.

It will be understood that many changes could be made in the particular features of mechanism as shown, and many apparently widely different embodiments of this invention could be made without departing from the scope thereof, and it is intended that all matter contained in the above description shall be interpreted as illustrative and not in a limiting sense.

What is claimed is:

1. In a hydraulically driven machine tool, a lubricant pressure source for a centralized branched lubricating installation with high restriction, flow metering outlets, comprising two vertically-positioned, axially-aligned elongated unpacked hydraulic and lubricant piston plungers, elongated axially aligned hydraulic and lubricant cylinder members embracing said plungers and having inlet and outlet connections for hydraulic pressure and lubricant respectively adjacent the top and bottom of said cylinder members, a U-shaped bracket having its upper leg supporting said hydraulic cylinder and its lower leg supporting said lubricant cylinder, a connecting rod connected to move with the upper end of the lubricant plunger, but merely contacting the lower end of the hydraulic plunger, a return oil spring encircling said connecting rod and a threaded adjustment positioned adjacent the point of contact of the connecting rod and the hydraulic plunger to change the position of the point of contact.

2. In the source of claim 2, said adjustment included a threaded portion on the hydraulic cylinder member and a threaded sleeve on said threaded portion regulating the position of said threaded portion.

3. In the source of claim 2, said connecting rod having a threaded portion and a threaded sleeve on said threaded portion to regulate the position of said threaded portion.

4. In a lubricant pressure pump, a hydraulic plunger, a connecting rod contacting the adjacent end of said plunger, a lubricant plunger having a spring pressed ball and socket connection to said connecting rod and a return coil spring connected to said connecting rod and positioned between said plungers, and hydraulic and lubricant cylinder members receiving said plungers, said plungers, cylinder members, connecting rod and coil spring being all axially aligned, and means to adjust said connecting rod and to vary the effective length thereof.

5. In a lubricant pressure pump, a hydraulic plunger, a connecting rod contacting the adjacent end of said plunger, a lubricant plunger having a spring pressed ball and socket connection to said connecting rod and a return coil spring connected to said connecting rod and positioned between said plungers, and hydraulic and lubricant cylinder members receiving said plungers, said plungers, cylinder members, connecting rod and coil spring being all axially aligned, and means to adjust said cylinder members together or apart.

6. In the pump of claim 4, said means including an adjustable sleeve on said connecting rod.

7. In the pump of claim 5, said means including an adjustable sleeve on said hydraulic cylinder member.

EDWARD H. KOCHER.

REFERENCES CITED

The following references are of record in the file of this patent:

UNITED STATES PATENTS

| Number | Name | Date |
|---|---|---|
| 298,836 | Dearing | May 20, 1884 |
| 458,450 | Fitzgerald | Aug. 25, 1891 |
| 828,326 | Manzel | Aug. 14, 1906 |
| 1,121,637 | Kreiss | Dec. 22, 1914 |

(Other references on following page)

UNITED STATES PATENTS

| Number | Name | Date |
|---|---|---|
| 1,761,423 | Woodruff | June 3, 1930 |
| 1,789,195 | Sagle | Jan. 13, 1931 |
| 1,864,195 | Hall | June 21, 1932 |
| 1,868,800 | Kreidel | July 26, 1932 |
| 1,897,300 | Clouse | Feb. 14, 1933 |
| 2,070,574 | Bijur | Feb. 16, 1937 |
| 2,072,001 | Guthans | Feb. 23, 1937 |
| 2,104,729 | Bijur | Jan. 11, 1938 |
| 2,140,983 | Carter | Dec. 20, 1938 |
| 2,145,854 | Bijur | Feb. 7, 1939 |
| 2,167,451 | Goldberg | July 25, 1939 |
| 2,224,502 | Grad | Dec. 10, 1940 |
| 2,229,095 | Kocher | Jan. 21, 1941 |

FOREIGN PATENTS

| Number | Country | Date |
|---|---|---|
| 265,547 | Germany | Oct. 10, 1913 |
| 399,114 | Germany | July 19, 1924 |